Figure 1:
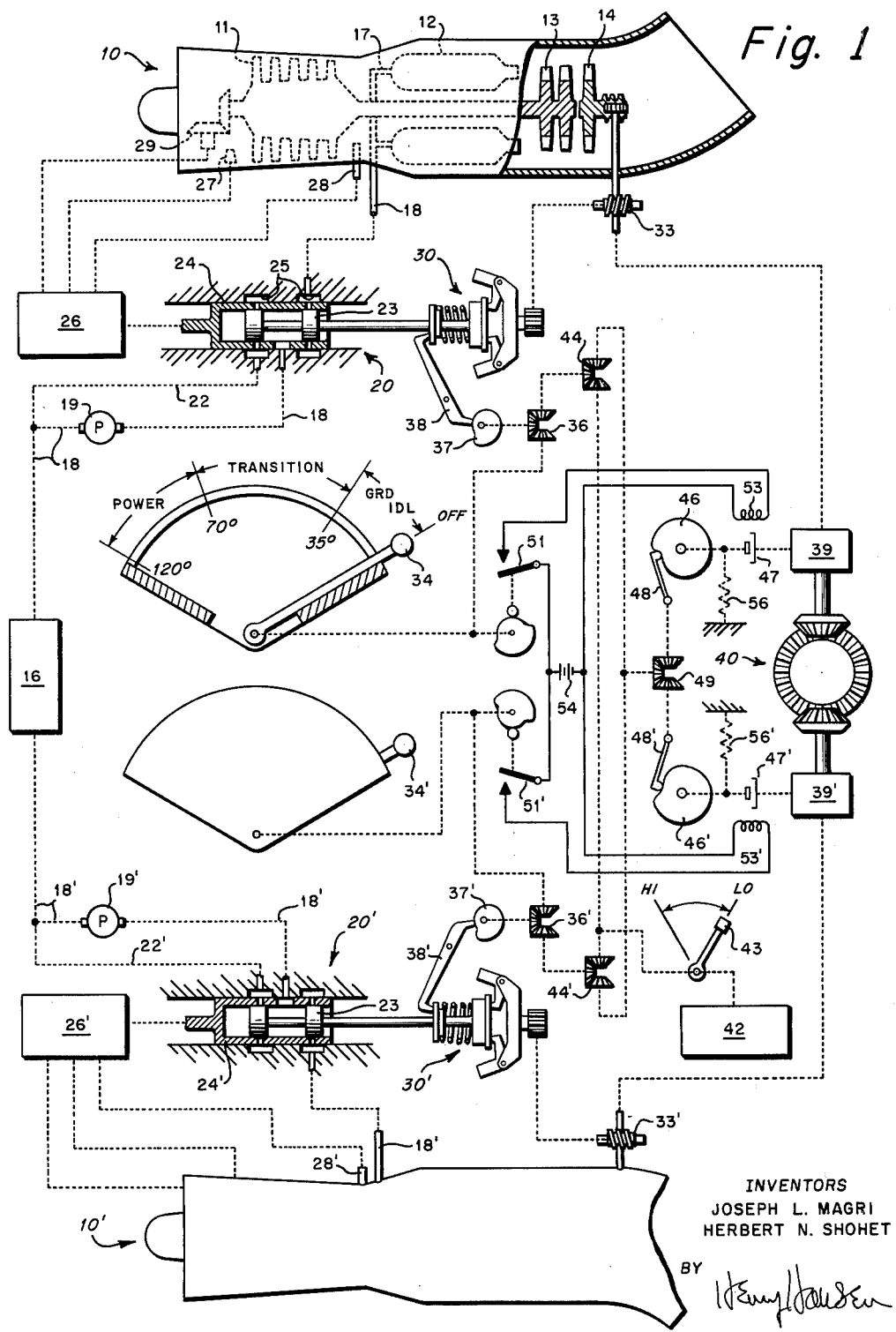

Aug. 17, 1965    J. L. MAGRI ETAL    3,200,886
DROOP COMPENSATED FUEL CONTROL SYSTEM
Filed May 28, 1964    2 Sheets-Sheet 1

INVENTORS
JOSEPH L. MAGRI
HERBERT N. SHOHET

BY
ATTORNEY

INVENTORS
JOSEPH L. MAGRI
HERBERT N. SHOHET
BY
ATTORNEY

United States Patent Office 3,200,886
Patented Aug. 17, 1965

3,200,886
DROOP COMPENSATED FUEL CONTROL SYSTEM
Joseph L. Magri, Danbury, and Herbert N. Shohet, Norwalk, Conn., assignors, by mesne assignments, to the United States of America as represented by the Secretary of the Navy
Filed May 28, 1964, Ser. No. 371,160
6 Claims. (Cl. 170—135.74)

The present invention relates to fuel control systems for gas turbine engines, and more particularly to a fuel control system for plural gas turbine engines in a helicopter.

It has been found that the rotor speed of a helicopter should remain the same for heavy loading as it is for light loading. In order to carry a heavier load or to increase altitude, additional lift is normally derived from collectively increasing the pitch of the rotor blades with the pilot's collective pitch stick. However, with an engine of the type in which the rotor blades are drivingly connected to a free power turbine and employing a "droop type" power turbine governor, the rotor blades will momentarily slow down. This is known as transient speed droop. Moreover, with an increased loading and with no change in the power turbine governor setting, the rotor speed will begin to resume speed but will level off at some amount less than the speed during the lighter loading. This is known as steady-state speed droop. Also, where the outputs of plural engines are combined to drive the helicopter rotor, the share of load carried by each engine will vary due to differences in their transient and steady-state droop characteristics.

Accordingly, it is an object of the present invention to provide an improved fuel control system particularly suited for a helicopter power plant which materially reduces transient and virtually eliminates steady-state rotor droop throughout the design load range.

Another object of the invention is to provide an improved fuel control system particularly suited for a plural-engine helicopter which will maintain equal engine load-sharing within close tolerances throughout all operating loads.

Still another object of the invention is to provide an improved gas turbine engine fuel control system having transient and steady-state speed droop compensation which is easily adjustable for obtaining uniform operation of a plurality of engines substantially different from each other in their performance characteristics.

Various other objects and advantages will appear from the following description of one embodiment of the invention, and the most novel features will be particularly pointed out hereinafter in connection with the appended claims.

Figure 2:
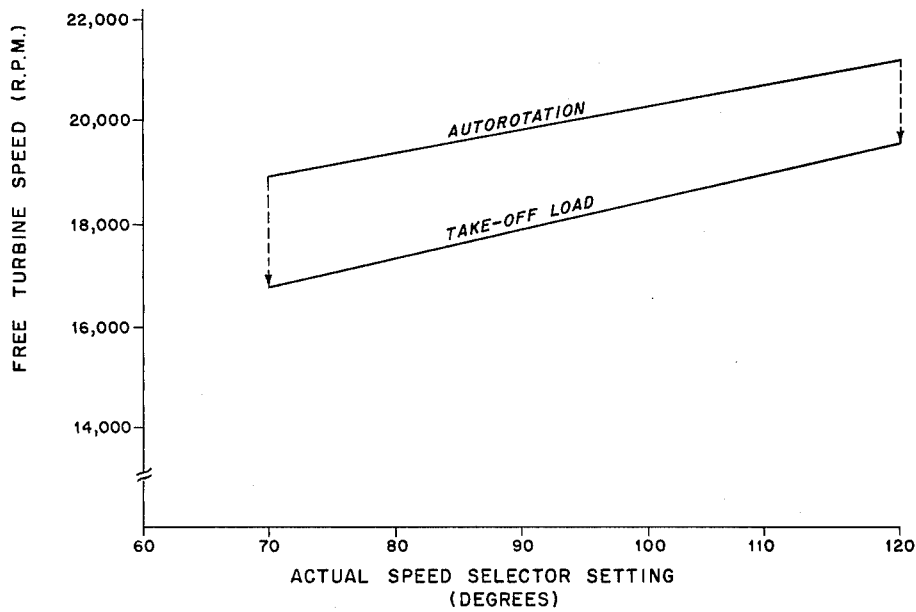
Figure 3:
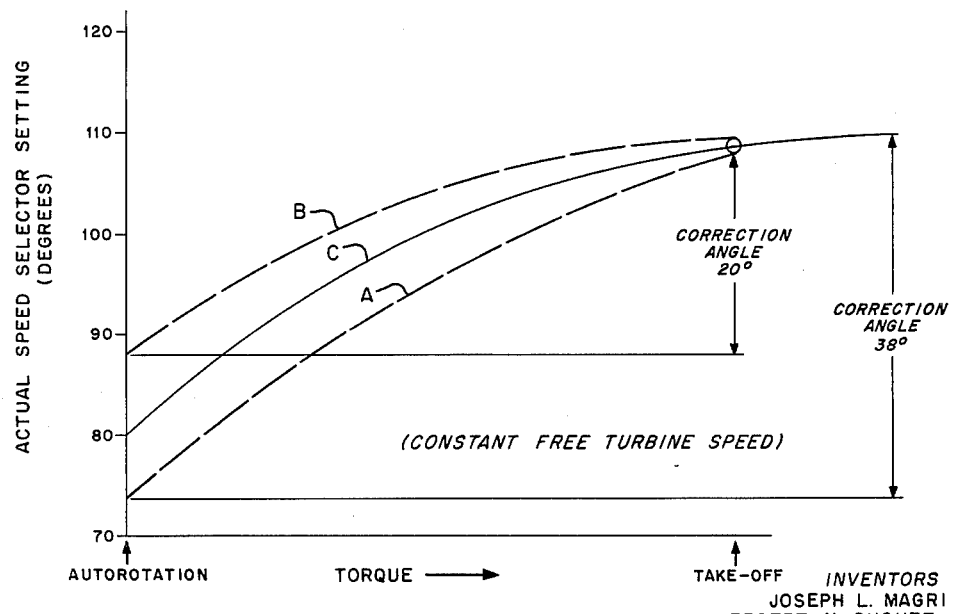

In the drawing:

FIG. 1 represents a diagrammatic view of one embodiment of the present invention; and FIGS. 2 and 3 graphically represent exemplary performance characteristics postulated for further describing operation of the embodiment of FIG. 1.

In the illustrated embodiment of the invention there are two twin axial flow gas turbine engines, indicated generally by the numerals 10 and 10', of the turboshaft type arranged side-by-side above the cabin of a helicopter, not shown. As shown in engine 10, engine 10' being identical in these respects, there is included an axial flow compressor 11, combustion chambers 12, a two-stage turbine 13 drivingly connected to the compressor 11, and a free power turbine 14 which is mechanically independent of the two-stage turbine 13. The compressor 11 and turbine 13 combination will hereinafter be referred to as the gas generator. Fuel is delivered from a fuel tank 16 to fuel nozzles 17 through a fuel supply conduit 18, a fluid pump 19, and a fuel metering valve, indicated generally by the numeral 20; excess fuel being returned through a fuel return conduit 22. For convenience, elements identified by primed numerals in the drawing refer to elements more associated with the engine 10' but are the same in function as the elements assigned corresponding non-primed numbers; and their functions will not be repeated herein except to the extent that they differ from those associated with the engine 10.

The fuel metering valve 20 may be any of a variety of types available in the prior art; but for purposes of illustration, the valve is shown as including a double spool plunger 23 axially slidable in a multi-port sleeve 24, which in turn is axially slidable relative to the valve housing. The ports of the sleeve 24 continuously register with inlet and outlet ports 25 for full opening, but their openings are modified by relative motion between the sleeve 24 and the plunger 23. The sleeve 24 is axially positioned by a conventional computer-actuator 26 which produces an output as a function of predetermined engine control parameters, such as compressor inlet temperature and discharge pressure, and gas generator speed. For these exemplary engine conditions, a temperature sensor 27, a pressure tap 28, and compressor gearing 29 are respectively provided as inputs to the computer-actuator 26. A pressure regulating valve, not shown, is usually required to maintain a constant pressure across the fuel metering valve 20 such as by bypassing excess fuel back to the inlet of the fuel pump 19. The axial position of the plunger 23 is determined independently of the computer-actuator 26 by a speed governor, indicated generally by the numeral 30, driven through output shaft gearing 32 and 33 from the free turbine 14.

The *actual* speed setting of the governor is manually and independently adjustable by the pilot through a speed selector lever 34 which is drivingly connected to one input of a differential 36 for producing rotation therewith. The output thereof angularly positions a speed selector cam 37. A cam follower lever 38 engageable at one end with the cam 37 modifies the governor setting in accordance with the position of the other end thereof. The differential 36 and other *super* are illustrated symbolically as having two opposed beveled gears for receiving independent rotational inputs which are algebraically added (or subtracted) to produce a rotational output on a third beveled gear connected in common. An example of such a differential is shown in U.S. Patent 3,118,318 issued January 21, 1964 to P. Rauhut.

The lever 34, shown in the OFF position typically has a total angular travel of 120°. From about 6° to 35°, the engine operates in ground-idle; from 35° to 70° (transition range), the engine speed increases to the normal range for flight; and from 70° to 120°, the engine operates in a speed range required for meeting the power demands of normal helicopter maneuvers.

The helicopter rotor system usually comprises a main lifting rotary wing and an anti-torque rotary rudder, both of which are usually driven by the combined outputs of multiple engines. In the present embodiment, the free turbine of each engine 10 and 10' is drivingly connected through its respective torque sensor 39 or 39' to a main transmission, indicated generally by the numeral 40, whose output is drivingly connected to the rotor system. A free-wheeling unit, not shown, located at each engine input to the main transmission 40 permits the rotary system to autorotate without engine drag in the event either engines fails or when either engine speed decreases below that required for the rotary wind speed.

Rotary wing pitch adjustment for increasing or decreasing the lift developed by the blades thereof is accomplished by a collective pitch actuator 42 connected to all of the blades through appropriate linkages, not shown. The actuator 42 responds to positioning by the pilot of a collective pitch stick 43, the latter being adjustable between flat pitch LO stop and maximum pitch or HI stop positions.

Referring now to FIG. 2, exemplary curves of free turbine speed versus *actual* speed selector setting are plotted for a typical engine of the type described hereinabove. For selector settings of the speed selector lever 34 between 70° and 120°, and with the collective pitch stick 43 at the LO stop position, the speed characteristic is postulated by the curve identified as AUTOROTATION. Now for any fixed position of the speed selector 34, if the collective pitch is increased until the torque output at the free turbine 14 equals the amount required for take-off, the speed of the power turbine 14 will decrease to an amount shown by the curve identified as TAKE-OFF LOAD. The incremental decrease in free turbine speed is referred to as total speed droop since the rotative speed of the power turbine and helicopter rotary wing propulsion system will proportionately decrease. The total speed droop is made up of a transient and steady-state components. The transient droop component results from the sudden change in rotor power demand requiring a temporary increase of fuel or a "hot shot" to the engine and need only last from one-quarter to one-half of a second, for reasons as will become apparent below.

Anticipation for the transient droop component occurring in both engines 10 and 10' is accomplished by respectively connecting the other inputs of the differentials 36 and 36' to the outputs of another pair of differentials 44 and 44'; each of the latter having one input rotatably connected in common to the collective pitch stick 43. Thus, with the remaining inputs to the differentials 44 and 44' held stationary, it can be seen that an increase in pitch stick position will produce rotation of the cams 37 and 37' to increase the *effective* speed settings at the governors 30 and 30'. Referring again to FIG. 2, this anticipatory transient droop compensation will translate the TAKE-OFF LOAD curve upward about 25% of the total droop thereby initiating an engine change simultaneously with a collective stick change.

Compensation for the steady-state droop component is intended to complete translation of the TAKE-OFF LOAD curve so that it substantially coincides with the AUTOROTATION curve thereby insuring that the free turbine of each engine 10 and 10' is maintained at a desired speed irrespective of the power demand. This is accomplished through use of the free turbine output torques. Additionally, steady-state droop compensation is utilized to achieve approximately equal load distribution between multiple engines by adding the individual output torques of the engines together and compensating each engine speed selector setting an amount proportional thereto. Referring again to FIG. 1, the output signals from the torque sensors 39 and 39' rotate compensator cams 46 and 46' through closed clutches 47 and 47' (shown in their normally open positions) in accordance with the torque output from the respective engine 10 or 10'. The angular rotation of cam followers 48 and 48' are added together in a differential 49 and the output thereof is connected to the remaining input of each of the differentials 44 and 44'. Thus, a fractional amount of the total torque of both engines 10 and 10' is used to increase the *effective* speed setting of the governors 30 and 30'. As mentioned previously, the equal load-sharing is made possible by using the total torque output of both engines 10 and 10' as the input signal to the differentials 44 and 44'. By appropriate gear ratios, this total torque signal is divided by an integer equal to the number of engines in order to obtain the actual steady-state compensation for each engine. In the present embodiment, for example, if the total torque is 300 foot-pounds, each engine is automatically adjusted for an output of 150 foot-pounds at the design power turbine speed. In this manner, the engines 10 and 10' will share the load equally because each will always be compensated to produce one-half of the total output torque at the design power turbine speed. Use of the torque signal also eliminates errors due to flight speed, altitude and temperature which change the collective stick versus aircraft torque demand relationship.

As with all engines of a given type, the profiles of cams 46 and 46' are the same, but it is necessary that each cam be adjusted angularly to allow for each engine's unique performance characteristics. What the cam profiles represent is best understood with reference to FIG. 3, in which exemplary curves A and B representing actual speed selector setting versus torque are plotted for two typical engines of the type described herein above. Cams 46 and 46', depending upon the portion of the cam surface utilized, will provide compensation for both minimum and maximum tolerance speed droop engines.

The cam adjustment normally is performed by the engine manufacturer when the fuel control is mated to the engine. To adjust the cam 46, for example, the required adjustment of the speed selector lever 34 is determined for the engine 10, before compensation in order to maintain a constant set speed, such as 19,000 r.p.m., as the engine without torque is varied from zero to maximum. In the exampel of FIG. 3, this was determined to be 38°. Cam 46 is then adjusted by rotating it on its shaft so that when the cam is operated through a range corresponding to zero and maximum engine output torque, the cam 46 will change the effective setting of the engine speed selector 34 (and the governor 30) by an amount sufficient to maintain the set speed, i.e. 38°. A similar approach would be used to determine the proper adjustment required for cam 46' of the engine 10' which might have to compensate for a lesser movement of the speed selector 34, for example, 20°. Thus cams 46 and 46' would in effect convert maximum and minimum droop engines into standard speed droop engines having identical speed selector angle versus output torque relationships (curve C, FIG. 3). The foregoing is contemplated to be an engine manufacturer adjustment such that all engines leaving his facility have identical torque/speed characteristics within very close tolerances.

The engine user, airframe manufacturer or operator, may also make this adjustment for the same purpose when changing the fuel control-engine combination. He may also use it to readjust as the result of rough handling, wear or installation effects. The user adjustment with the engines installed in the aircraft is accomplished by placing the speed selector levers 34 and 34' in the governing range and at similar angular positions such that the rotor is at desired set speed. A nominal low or moderate level power is then demanded by use of the collective pitch stick 43, and the output torques of the engines are compared. Should the output torques differ, slight angular adjustments of cams 46 and 46' by reducing compensation on the high torque engine and raising it on the low torque engines, accomplishes the cam adjustment.

The exact torque values at which these calibrations are made do not have to be identical for all engines. Small variations would have no effect on the accuracy of the calibration since the angular position of the speed selector lever on the engines would always correspond to the particular torque output demanded from that engine.

It is contemplated that speed droop compensation be effective only in the power range of the speed selector levers 34 and 34'. The normally open clutches 47 and 47' have, therefore, been provided to transfer torque signals only when the levers 34 and 34' are moved about the 70° position. This is accomplished by cam-operated switches 51 and 51' operatively connected to the levers 34 and 34' for closing a circuit including cltuch solenoids 53 and 53' and a power supply 54. Flyback springs 56 and 56' are provided to return the compensator cams 46 and 46' to their non-compensating position when clutches 47 and 47' are disengaged.

Operation

With the collective pitch stick 43 at the LO stop position and the speed selector levers 34 and 34' set typically somewhere between 6° and 35°, the fuel to the engines 10 and 10' is regulated for ground-idling in response to computer-actuator 26, the speed of the free turbines 14 (and 14') and the position of the levers 34 and 34'.

As the levers 34 and 34' are advanced from 35° to 70°, the *actual* speed setting of the governors 30 and 30' increase and re-position the plunger 23 of the valve 29 in order that the engine will have attained sufficient speed for take-off when the levers 34 and 34' have reached the 70° position. At this latter position, cam-actuated switches 51 and 51' cause clutches 47 and 47' to close and transmit torque signals from the sensors 39 and 39' into the differential 49. Having attained a power turbine speed in both engines 10 and 10' sufficient for take-off, the pilot advances the collective pitch stick 43 a desired amount for lift thereby simultaneously increasing the rotor blade pitch and the *effective* speed setting of the governors 30 and 30'. The latter event produces a "hot shot" of fuel to the engines 10 and 10' anticipatory of the transient droop experienced between one-fourth and one-half second before steady-state droop compensation becomes effective. As the torque sensors 39 and 39' sense the sudden increase in load demand, cams 46 and 46' rotate amounts proportional to the torque on the free power turbines of engines 10 and 10' producing a total torque signal at the output of the differential 49. This signal modifies the *effective* speed setting existing theretofore from the combined inputs of the speed selector levers 34 and 34' and the collective pitch stick position 43. Thus, total droop compensation and equal load-sharing between engines 10 and 10' is accomplished.

Likewise, a decrease in speed selector levers 34 or 34' and a decrease in collective pitch stick 43 position will be accompanied by corresponding decreases in transient and steady-state droop compensation while still maintaining equal load-sharing between engines.

It should be apparent that many of the inventive concepts hereindescribed are not limted to plural engine applications nor to helicpoter operationse. For example, the total speed droop compensation features may be used with any number of engines including one, and the equal load-sharing features can be adapted for more than two engines, without departing from the fundamental inventive concepts herein set forth.

It will be understood, of course, that various changes in the details, materials, steps and arrangement of parts, which have been herein described and illustrated in order to explain the nature of the invention, may be made by those skilled in the art within the principle and scope of the invention as expressed in the appended claims.

What is claimed is:

1. A fuel control system for a gas turbine power plant having a free turbine means drivingly connected to a load device, a pressurized source of fuel, nozzle means for discharging fuel into the power plant, conduit means connecting source to said nozzle means, fuel metering valve means in said conduit means, computer-actuator means having input signals of selected power plant operating conditions and an output operatively connected to said valve means for controlling the fuel flow therethrough as a function of said computer-actuator means inputs, governor means having inputs of free turbine means speed and actual speed setting and an output operatively connected to said fuel metering valve means for controlling the fuel flow therethrough as a function of said governor means inputs, the improvement comprising:

free turbine means droop compensator means having an output operatively connected to the actual speed setting input of the speed governor means for producing thereby an effective speed setting, differential means having two inputs and an output, said output being operatively connected to said droop compensator means output, load regulating means operative on said load device and one input of said differential means, and torque sensor means having a torque input from said free turbine means and an output operative on the other input of said differential means.

2. A fuel control system for a plurality of gas turbine power plants each having a free turbine means, a pressurized source of fuel, nozzle means for discharging fuel into its power plant, conduit means connecting said source to said nozzle means, fuel metering valve means in said conduit means, computer-actuator means having input signals of selected power plant operating conditions and an output operatively connected to said valve means for controlling the fuel flow therethrough as a function of said computer-actuator means inputs, governor means having inputs of free turbine means speed and an actual speed setting, and an output operatively connected to said fuel metering valve means for controlling the fuel flow therethrough as a function of said governor means inputs. a load device drivingly connected to each of said free turbine means, the improvement comprising:

free turbine means droop compensator means having an output operatively connected to the actual speed setting inputs of said speed governor means for producing thereby effective speed settings, differential means having an output operatively connected to said droop compensator means output, load regulating means operative on said load device and one input of said differential means, and torque sensor means having torque inputs from each of said free turbine means and an output operative on another input of said differential means.

3. A fuel control system as set forth in claim 1, further comprising:

disabling means operatviely connected between the other input of said differential means and the output of said torque sensor means and responsive to the actual speed setting for rendering said sensor means ineffective below a predetermined setting.

4. A fuel control system as set forth in claim 1, wherein the power plant is mounted in a helicopter and said load regulating means comprises:

a collective pitch stick operatively connected to collective pitch actuator means of the helicopter rotor blades.

5. A fuel control system as set forth in claim 2, wherein the power plant is mounted in a helicpoter and said load regulating means comprises:

a collective pitch stick operatively connected to collective pitch actuator means of the helicopter rotor blades.

6. A fuel control system as set forth in claim 1, wherein the power plant is mounted in a helicopter and said load regulating means comprises:

a collective pitch stick operatively connected to a collective pitch actuator means of the helicopter rotor blades.

References Cited by the Examiner

UNITED STATES PATENTS

| 2,942,416 | 6/60 | Buckingham | 60—39.15 |
| 3,034,583 | 5/62 | Best | 170—135.74 |
| 3,131,770 | 5/64 | Szydlowski | 170—135.74 |

MARK NEWMAN, *Primary Examiner.*

JULIUS E. WEST, *Examiner.*